United States Patent
Li et al.

(10) Patent No.: US 8,311,575 B2
(45) Date of Patent: Nov. 13, 2012

(54) HANDHELD MOBILE PHONE AND METHOD FOR RESETTING THE HANDHELD MOBILE PHONE THEREOF

(75) Inventors: Chih-Hung Li, Taoyuan County (TW); Szu-Yuan Huang, Taoyuan County (TW); Yung-Hsien Kuo, Taoyuan County (TW)

(73) Assignee: HTC Corporation, Taoyuan, Taoyuan County (TW)

( * ) Notice: Subject to any disclaimer, the term of this patent is extended or adjusted under 35 U.S.C. 154(b) by 134 days.

(21) Appl. No.: 12/813,512

(22) Filed: Jun. 11, 2010

(65) Prior Publication Data

US 2010/0331046 A1    Dec. 30, 2010

(30) Foreign Application Priority Data

Jun. 26, 2009 (TW) .............................. 98121617 A

(51) Int. Cl.
*H04M 1/00* (2006.01)

(52) U.S. Cl. .................. 455/550.1; 455/167.1; 455/564; 455/552.1; 455/39; 455/90.3; 713/310

(58) Field of Classification Search ............... 455/550.1, 455/167.1, 564, 552.1, 39, 561, 90.3; 713/310
See application file for complete search history.

(56) References Cited

U.S. PATENT DOCUMENTS

| | | | |
|---|---|---|---|
| 3,846,707 A * | 11/1974 | Sakamoto et al. | 455/167.1 |
| 5,422,656 A * | 6/1995 | Allard et al. | 345/173 |
| 5,758,170 A | 5/1998 | Woodward | |
| 5,850,546 A * | 12/1998 | Kim | 713/1 |
| 6,001,015 A * | 12/1999 | Nishiumi et al. | 463/38 |
| 6,006,107 A * | 12/1999 | Tomioka et al. | 455/552.1 |
| 6,007,428 A * | 12/1999 | Nishiumi et al. | 463/36 |
| 6,325,718 B1 * | 12/2001 | Nishiumi et al. | 463/36 |
| 6,332,840 B1 * | 12/2001 | Nishiumi et al. | 463/38 |
| 6,567,675 B1 * | 5/2003 | Rosen et al. | 455/564 |
| 6,625,739 B1 * | 9/2003 | Kobayashi | 713/310 |
| 7,496,377 B2 * | 2/2009 | Kwon | 455/550.1 |
| 7,734,251 B1 * | 6/2010 | Harvey et al. | 455/39 |
| 7,792,657 B2 * | 9/2010 | Kobayashi et al. | 702/138 |
| 7,937,110 B2 * | 5/2011 | Wu et al. | 455/561 |
| 2004/0137938 A1 * | 7/2004 | Deubler, Jr. | 455/550.1 |
| 2005/0122248 A1 * | 6/2005 | Chang et al. | 341/173 |
| 2008/0070617 A1 * | 3/2008 | Ban | 455/550.1 |
| 2010/0146439 A1 * | 6/2010 | Ariga | 715/810 |

FOREIGN PATENT DOCUMENTS

CN    101311880 A    11/2008

OTHER PUBLICATIONS

Office action mailed on May 28, 2012 for the China application No. 200910158761.9, filing date Jul. 7, 2009, pp. 1-6.

\* cited by examiner

*Primary Examiner* — April G Gonzales
(74) *Attorney, Agent, or Firm* — Winston Hsu; Scott Margo

(57) ABSTRACT

A handheld mobile phone includes at least two buttons, a logic circuit, and a processing unit, wherein each button is used for performing at least one specific function. The logic circuit is coupled to the at least two buttons for generating a corresponding specific signal when one of the at least two buttons is pressed alone, and for generating at least a control signal when all of the at least two buttons are pressed. The processing unit executes the specific function of the pressed button according to the corresponding specific signal. When all of the at least two buttons are pressed, the processing unit controls the handheld mobile phone to enter a reset state from an operating state according to at least the control signal.

19 Claims, 8 Drawing Sheets

HANDHELD MOBILE PHONE AND METHOD FOR RESETTING THE HANDHELD MOBILE PHONE THEREOF

BACKGROUND OF THE INVENTION

1. Field of the Invention

The present disclosure relates to a handheld mobile phone and a related method for resetting the handheld mobile phone, and more particularly, to a method and a handheld mobile phone for resetting the handheld mobile phone by making use of pressing two (or more) buttons of the handheld mobile phone together with a button flowchart to replace the conventional reset button.

2. Description of the Prior Art

With the era of communications, demands for handheld devices such as smart phones, personal digital assistants (PDAs), and mobile phones are increasing day by day. Currently, the electronic products are usually designed with the trend of light weight and small size, hence it is very important for the electronic products to control the size and cost.

At present, commercially available PDA phones are commonly equipped with a separate reset button. In order to avoid erroneously pressing this reset button, the reset button is usually hidden in a small hole and a "stylus" is required for the user to be able to press the reset button through the hole. If a PDA phone equipped with a capacitive touch screen has no stylus, the user must find a tip-like object to sting the reset button, which brings the user unnecessary trouble and inconvenience.

SUMMARY OF THE INVENTION

It is one of the objectives of the disclosure to provide a handheld mobile phone and a method for resetting the handheld mobile phone to solve the abovementioned problems.

According to one embodiment, a handheld mobile phone is provided. The handheld mobile phone consists of at least two buttons, a logic circuit, and a processing unit. Each button is used for performing at least one specific function. The logic circuit is coupled to the at least two buttons. The logic circuit generates a corresponding specific signal when one of the least two buttons is pressed alone, and generates at least a control signal when all of the at least two buttons are pressed. The processing unit is coupled to the logic circuit. The processing unit executes the specific function of the pressed button according to the corresponding specific signal, and controls the handheld mobile phone to enter a reset state from an operating state according to at least the control signal when all of the at least two buttons are pressed.

According to another embodiment, a method for resetting a handheld mobile phone is provided. The handheld mobile phone includes at least two buttons, wherein each button is used for performing at least one specific function. The method includes the steps of: detecting pressed statuses of the at least two buttons; when one of the at least two buttons is pressed alone, generating a corresponding specific signal; executing the specific function of the pressed button according to the corresponding specific signal; when all of the at least two buttons are pressed, generating at least a control signal; and controlling the handheld mobile phone to enter a reset state from an operating state according to at least the control signal.

These and other objectives of the present invention will no doubt become obvious to those of ordinary skill in the art after reading the following detailed description of the preferred embodiment that is illustrated in the various figures and drawings.

DETAILED DESCRIPTION

Figure 1:
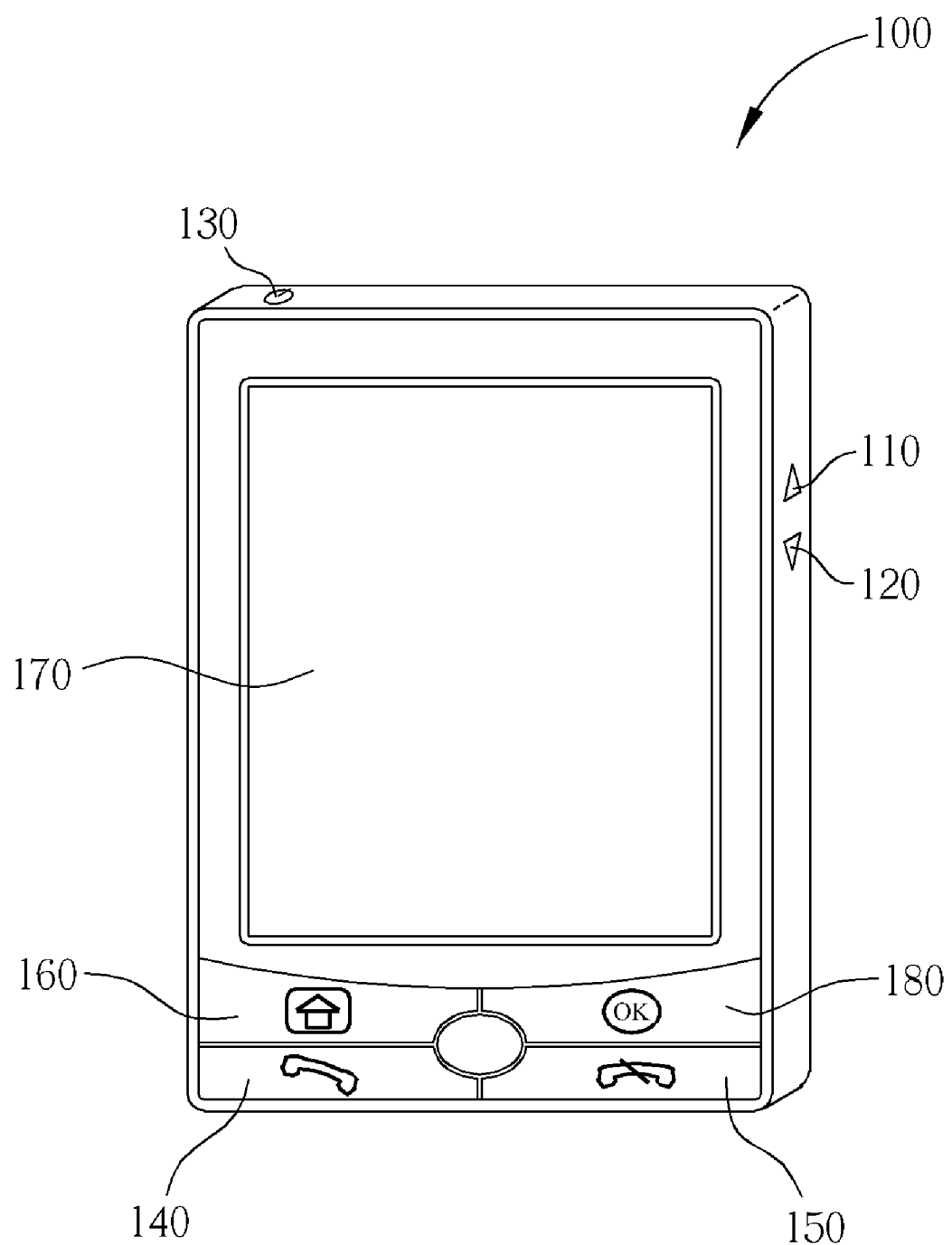
FIG. 1 is a perspective view of an illustrative handheld mobile phone of the present disclosure.
Figure 2:
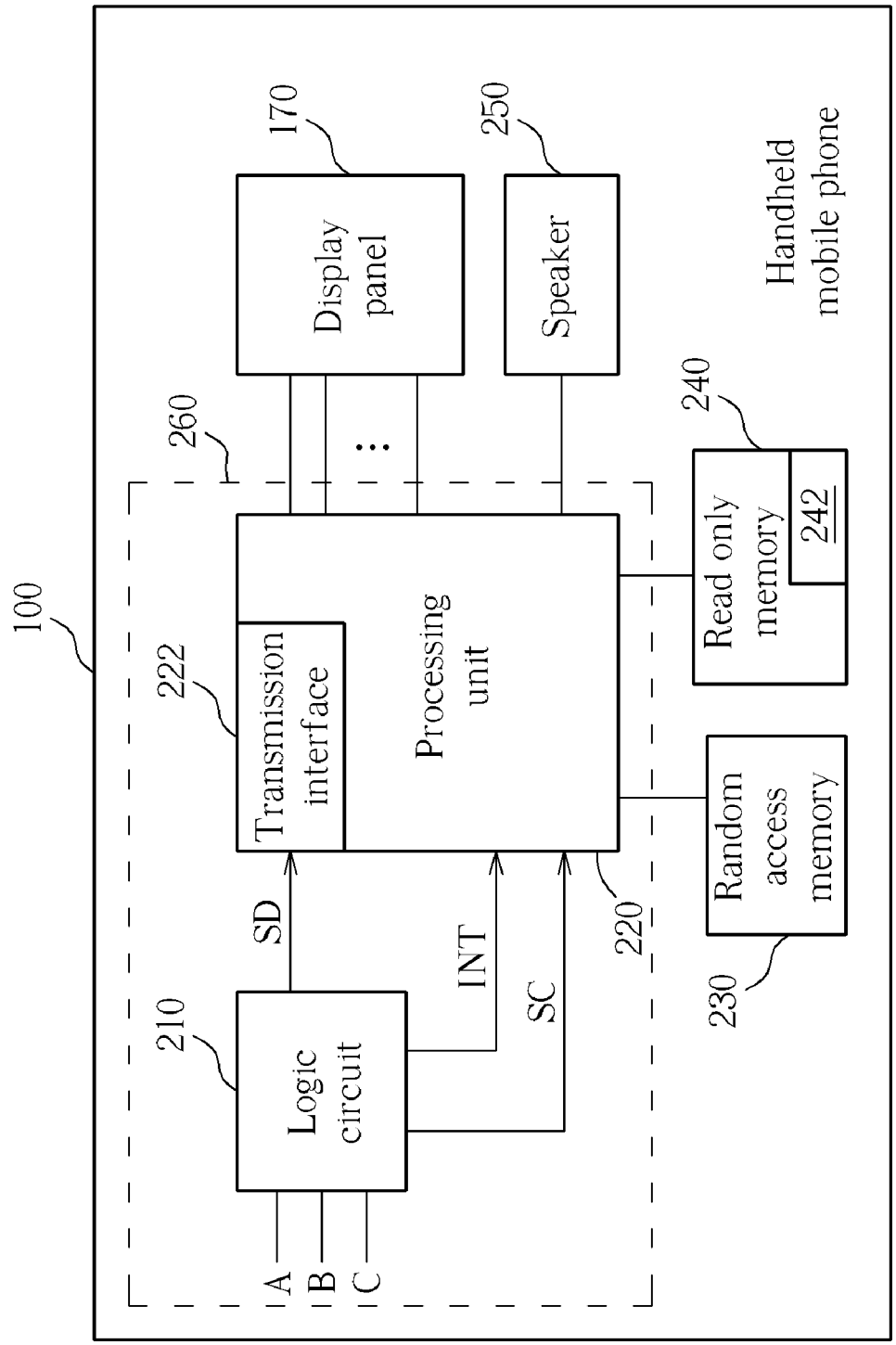
FIG. 2 is a diagram showing internal components of the handheld mobile phone shown in FIG. 1.

Please refer to FIG. 1 together with FIG. 2. FIG. 1 is a perspective view of an illustrative handheld mobile phone 100 of the present disclosure, and FIG. 2 is a diagram showing internal components of the handheld mobile phone 100 shown in FIG. 1. As shown in FIG. 1, the appearance of the handheld mobile phone 100 includes a display panel 170 (or a touch panel) for displaying user information and a plurality of buttons, such as: a volume up button 110, a volume down button 120, a power button 130, a send button 140, an end button 150, a home button 160, and an OK button 180.

As shown in FIG. 2, the handheld mobile phone 100 includes, but is not limited to, at least two buttons, a logic circuit 210, a processing unit 220, a display panel 170, a random access memory (RAM) 230, a read only memory (ROM) 240, and a speaker 250. In this embodiment, three buttons A, B, and C are cited as an example for description of the present disclosure. Each of the buttons A, B, and C is used for performing at least one specific function. For example, the specific function corresponding to a send button can be performed for making a phone call or answering an incoming call to establish a call connection when the handheld mobile phone 100 is in a standby state; the specific function corresponding to an end button can be performed for interrupting the call connection; the specific function corresponding to a volume up button can be performed for increasing the volume of the speaker 250; the specific function corresponding to a volume down button can be performed for lowering the volume of the speaker 250; the specific function corresponding to a home button can be performed for making the screen of the handheld mobile phone 100 return to a home page; the specific function corresponding to a power button can be performed for powering off the handheld mobile phone 100;

and the specific function corresponding to an OK button can be performed for confirming a command or a program. The logic circuit 210 is coupled to the three buttons A, B, and C for detecting pressed statuses of at least two buttons of the three buttons A, B, and C. When one of the three buttons A, B, and C is pressed alone, the logic circuit 210 generates a corresponding specific signal SD. When at least two buttons among the three buttons A, B, and C are pressed, the logic circuit 210 generates an interrupt signal INT and a control signal SC. The processing unit 220 (e.g. a central processing unit, CPU) is coupled to the logic circuit 210. When one of the three buttons A, B, and C is pressed alone, the processing unit 220 receives the specific signal SD via a transmission interface 222 (e.g. a general-purpose input/output interface, a GPIO interface), and then executes the specific function of the pressed button according to the corresponding specific signal SD. When at least two buttons among the three buttons A, B, and C are pressed, the processing unit 220 controls the handheld mobile phone 100 to enter a reset state SR from an operating state S0 according to the interrupt signal INT and the control signal SC.

In this embodiment, the aforementioned control signal is a reset signal. Therefore, when at least two buttons among the three buttons A, B, and C are pressed, the logic circuit 210 generates the interrupt signal INT to notify the processing unit 220 of storing the current system information and then generates the reset signal (i.e. the control signal SC) to the processing unit 220 after the interrupt signal INT is generated for a period of time T1. When the processing unit 220 receives the reset signal, it controls the handheld mobile phone 100 to enter the reset state SR from the operating state S0. At this time, the processing unit 220 resets the handheld mobile phone 100. For example, when the processing unit 220 resets the handheld mobile phone 100, the processing unit 220 clears the RAM 230 and then loads the embedded operating system 242 stored in the ROM 240 into the RAM 230 in order to complete the action of resetting the handheld mobile phone 100. Be noted that the abovementioned logic circuit 210 and processing unit 220 can be integrated into an identical chip 260, but this should not be considered as limitations of the present disclosure.

In short, when one of the three buttons A, B, and C is pressed alone, the processing unit 220 executes the specific function of the pressed button according to the corresponding specific signal SD; and when at least two buttons among the three buttons A, B, and C are pressed, the processing unit 220 resets the handheld mobile phone 100. Therefore, not only can the cost and the space for a reset button be saved, but also can the problem that users cannot find a "stylus" or a tip-like object to sting the reset button in the prior art be solved.

Please note that the abovementioned handheld mobile phone 100 can be a PDA phone, but the present disclosure is not limited to this only. In addition, the three buttons A, B, and C mentioned above are physical buttons of the handheld mobile phone 100, such as any one of the plurality of buttons 110~160 and 180 shown in FIG. 1. But this is presented merely for describing the present disclosure, and in no way should be considered to be limitations of the scope of the present disclosure. Furthermore, in the abovementioned embodiment, an example that at least two buttons among the three buttons A, B, and C are simultaneously pressed is cited for illustration, but this should not be considered as limitations of the present disclosure. The number of the pressed buttons is not limited.

Figure 4:
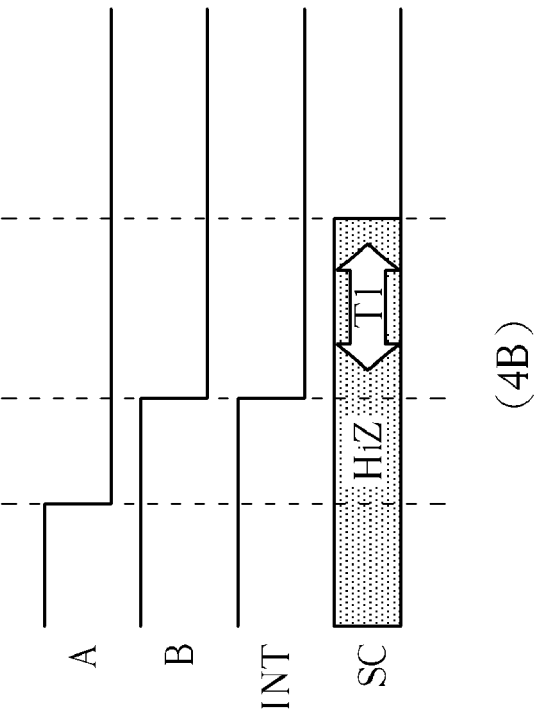
FIG. 4 (including 4A and 4B) is a diagram illustrating how the logic circuit and the processing unit shown in FIG. 2 reset the handheld mobile phone according to a second embodiment of the present disclosure.
Figure 4:
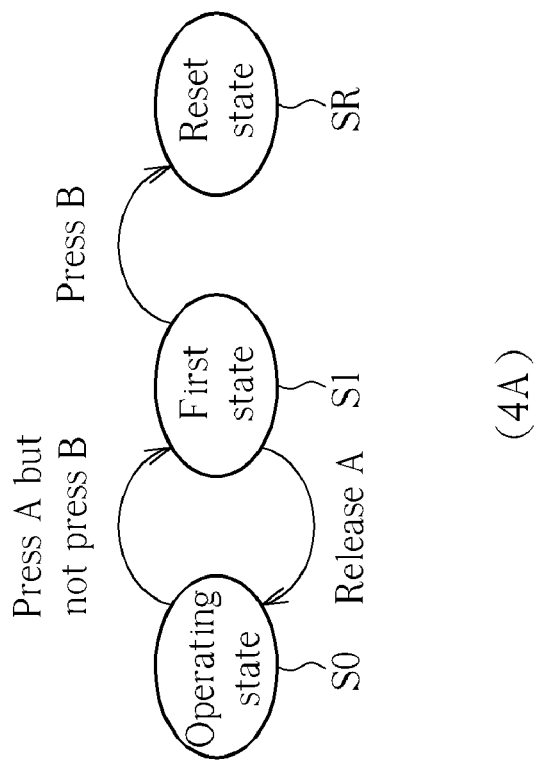
Figure 5:
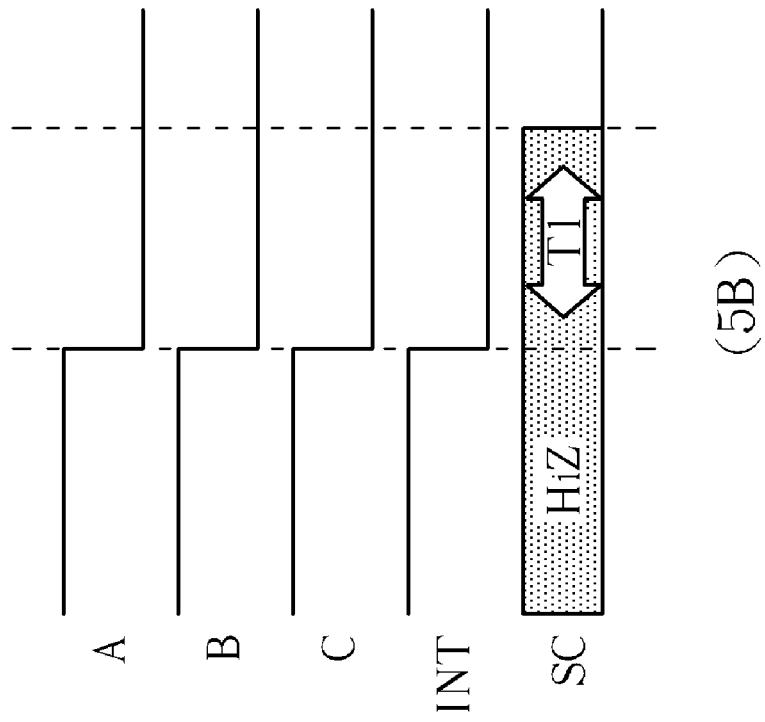
FIG. 5 (including 5A and 5B) is a diagram illustrating how the logic circuit and the processing unit shown in FIG. 2 reset the handheld mobile phone according to a third embodiment of the present disclosure.
Figure 5:
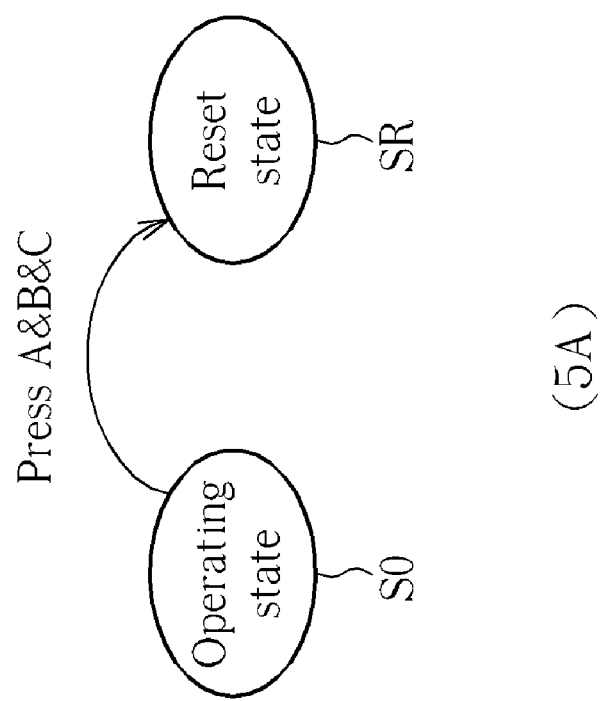

In the following descriptions, several examples are taken for illustrating how the logic circuit 210 and the processing unit 220 shown in FIG. 2 reset the handheld mobile phone 100. In a first case, by reference to FIG. 3, it is directed to a condition that both of the two buttons are pressed without considerations of a pressed sequence of the pressed buttons. In a second case, by reference to FIG. 4, it is directed to a condition that both of the two buttons are pressed with considerations of the pressed sequence of the pressed buttons. In a third case, by reference to FIG. 5, it is directed to a condition that all of the three buttons are pressed without considerations of the pressed sequence of the pressed buttons. In a fourth case, by reference to FIG. 6, it is directed to a condition that all of the three buttons are pressed with considerations of the pressed sequence of the pressed buttons.

Figure 3:
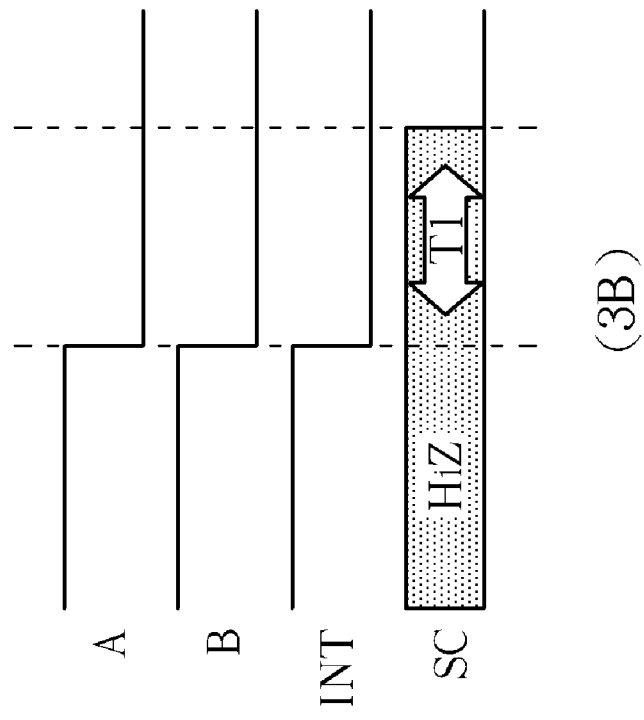
FIG. 3 (including 3A and 3B) is a diagram illustrating how the logic circuit and the processing unit shown in FIG. 2 reset the handheld mobile phone according to a first embodiment of the present disclosure.
Figure 3:
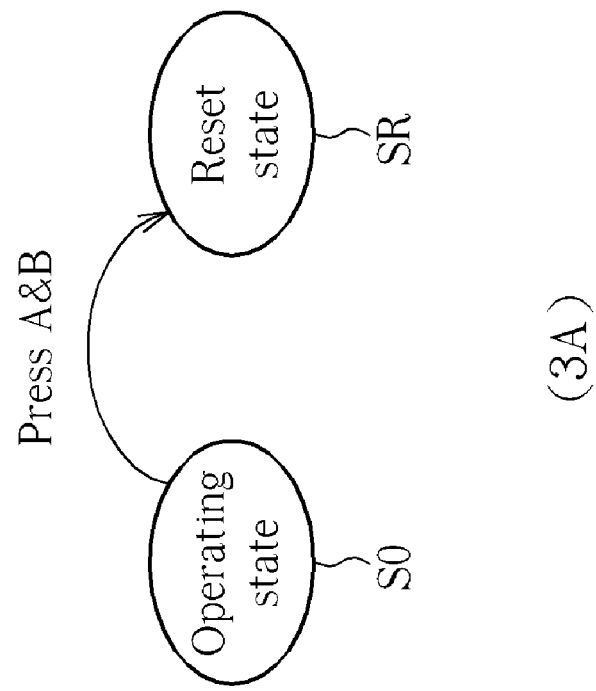

Please refer to FIG. 3 (including 3A and 3B). As shown in 3A, assume that the handheld mobile phone 100 is in the operating state S0 in the beginning. When at least two buttons (such as the buttons A and B) among the three buttons A, B, and C are pressed, the processing unit 220 controls the handheld mobile phone 100 to enter the reset state SR from the operating state S0. As shown in 3B, the high logic level "1" is used for representing a condition that the button A/B is not pressed, and the low logic level "0" is used for representing a condition that the button A/B is pressed. Only when both of the two buttons A and B are pressed, the logic circuit 210 sends the interrupt signal INT (which is represented by the low logic level "0") to the processing unit 220, and then sends the control signal SC (which is represented by the low logic level "0") to the processing unit 220 after the interrupt signal INT is generated for a period of time T1. When the processing unit 220 receives the control signal SC, it controls the handheld mobile phone 100 to enter the resent state SR from the operating state S0.

Please note that the abovementioned operating state S0 may include a normal operating state, a standby state, a sleeping state or a shut down state. If the user wants to reset the handheld mobile phone 100, this action can be easily completed by simultaneously pressing at least two buttons (e.g. the buttons A and B) among the three buttons A, B, and C. For example, the operating state S0 is a standby state, in which the handheld mobile phone 100 is waiting to make a phone call or answer an incoming call so as to establish a call connection.

However, in the abovementioned embodiment, only the convenience of resetting the handheld mobile phone is taken into account without considerations of erroneous actions. Hence, a judgment mechanism may be added in order to avoid erroneous actions. Please refer to FIG. 4 (including 4A and 4B). As shown in 4A, assume that the handheld mobile phone 100 is in the operating state S0 in the beginning. When the button A is pressed and the button B is not pressed, the processing unit 220 controls the handheld mobile phone 100 to enter a first state S1 from the operating state S0. When both of the buttons A and B are pressed, the processing unit 220 controls the handheld mobile phone 100 to enter the reset state SR from the first state S1. Be noted that: after the handheld mobile phone 100 enters the first state S1, it will return back to the operating state S0 automatically if the user releases the button A at this time. Or it will enter the reset state SR if the user presses the button B at this time. As shown in 4B, the high logic level "1" is used for representing a condition that the button A/B is not pressed, and the low logic level "0" is used for representing a condition that the button A/B is pressed. Only when the two buttons A and B are sequentially pressed, the logic circuit 210 sends the interrupt signal INT (which is represented by the low logic level "0") to the processing unit 220, and then sends the control signal SC (which is represented by the low logic level "0") to the processing unit 220 after the interrupt signal INT is generated for a period of time T1. In other words, in this embodiment, only when the pre-defined pressed sequence of the pressed buttons (i.e. A→B) is satisfied, the action of resetting the handheld mobile phone 100 can be executed in order to avoid erroneous actions.

Please note that the aforementioned at least two buttons can be selected from a group consisting of the volume up button 110, the volume down button 120, the power button 130, the send button 140, the end button 150, the home button 160, and the OK button 180. For example, the aforementioned at least two buttons can be a combination of the volume up button 110 and the power button 130, a combination of the send button 140 and the volume down button 120, a combination of the end button 150 and the power button 130, or a combination of the OK button 180 and the power button 130. But this is presented merely for describing the features of the present disclosure, and in no way should be considered to be limitations of the scope of the present disclosure.

In the abovementioned embodiments, the goal of the present disclosure can be achieved by simultaneously pressing two buttons. However, the same goal can also be achieved by simultaneously pressing three buttons (or more buttons) in the present disclosure. Please refer to FIG. 5 (including 5A and 5B). As shown in 5A, assume that the handheld mobile phone 100 is in the operating state S0 in the beginning. When all of the three buttons A, B, and C are pressed, the processing unit 220 controls the handheld mobile phone 100 to enter the reset state SR from the operating state S0. As shown in 5B, the high logic level "1" is used for representing a condition that the button A/B/C is not pressed, and the low logic level "0" is used for representing a condition that the button A/B/C is pressed. Only when all of the three buttons A, B, and C are pressed, the logic circuit 210 sends the interrupt signal INT (which is represented by the low logic level "0") to the processing unit 220, and then sends the control signal SC (which is represented by the low logic level "0") to the processing unit 220 after the interrupt signal INT is generated for a period of time T1. When the processing unit 220 receives the control signal SC, it controls the handheld mobile phone 100 to enter the reset state SR from the operating state S0.

Figure 6:
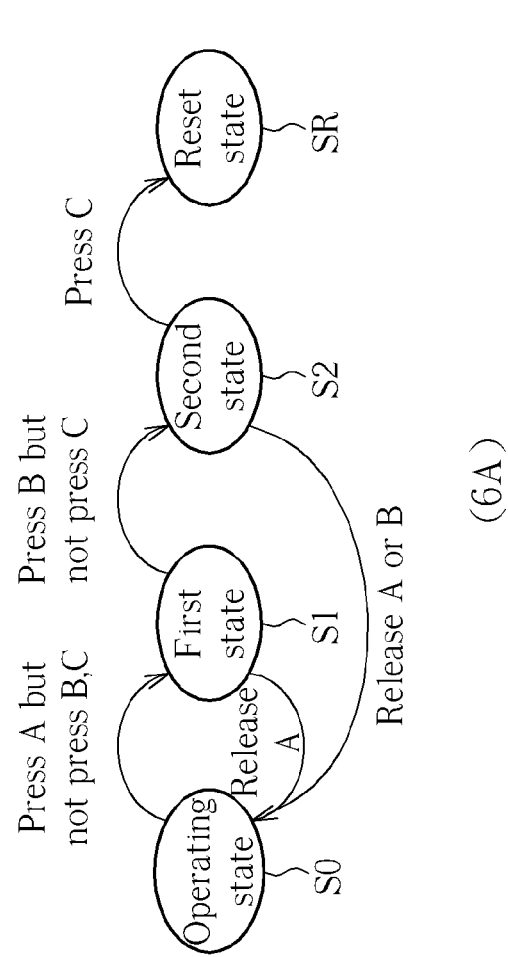
FIG. 6 (including 6A and 6B) is a diagram illustrating how the logic circuit and the processing unit shown in FIG. 2 reset the handheld mobile phone according to a fourth embodiment of the present disclosure.

Please refer to FIG. 6 (including 6A and 6B). As shown in 6A, assume that the handheld mobile phone 100 is in the operating state S0 in the beginning. When the button A is pressed and the buttons B and C are not pressed, the processing unit 220 controls the handheld mobile phone 100 to enter a first state S1 from the operating state S0. When the buttons A and B are pressed and the button C is not pressed, the processing unit 220 controls the handheld mobile phone 100 to enter a second state S2 from the first state S1. When all of the three buttons A, B, and C are pressed, the processing unit 220 controls the handheld mobile phone 100 to enter the reset state SR from the second state S2. Be noted that after the handheld mobile phone 100 enters the first state S1 or the second state S2, it will return back to the operating state S0 automatically if the user releases the button A or the button B at this time. As shown in 6B, the high logic level "1" is used for representing a condition that the button A/B/C is not pressed, and the low logic level "0" is used for representing a condition that the button A/B/C is pressed. Only when the three buttons A, B, and C are sequentially pressed, the logic circuit 210 sends the interrupt signal INT (which is represented by the low logic level "0") to the processing unit 220, and then sends the control signal SC (which is represented by the low logic level "0") to the processing unit 220 after the interrupt signal INT is generated for a period of time T1. In other words, in this embodiment, only when the pre-defined pressed sequence of the pressed buttons (i.e. A→B→C) is satisfied, the action of resetting the handheld mobile phone can be executed in order to avoid erroneous actions.

Figure 7:
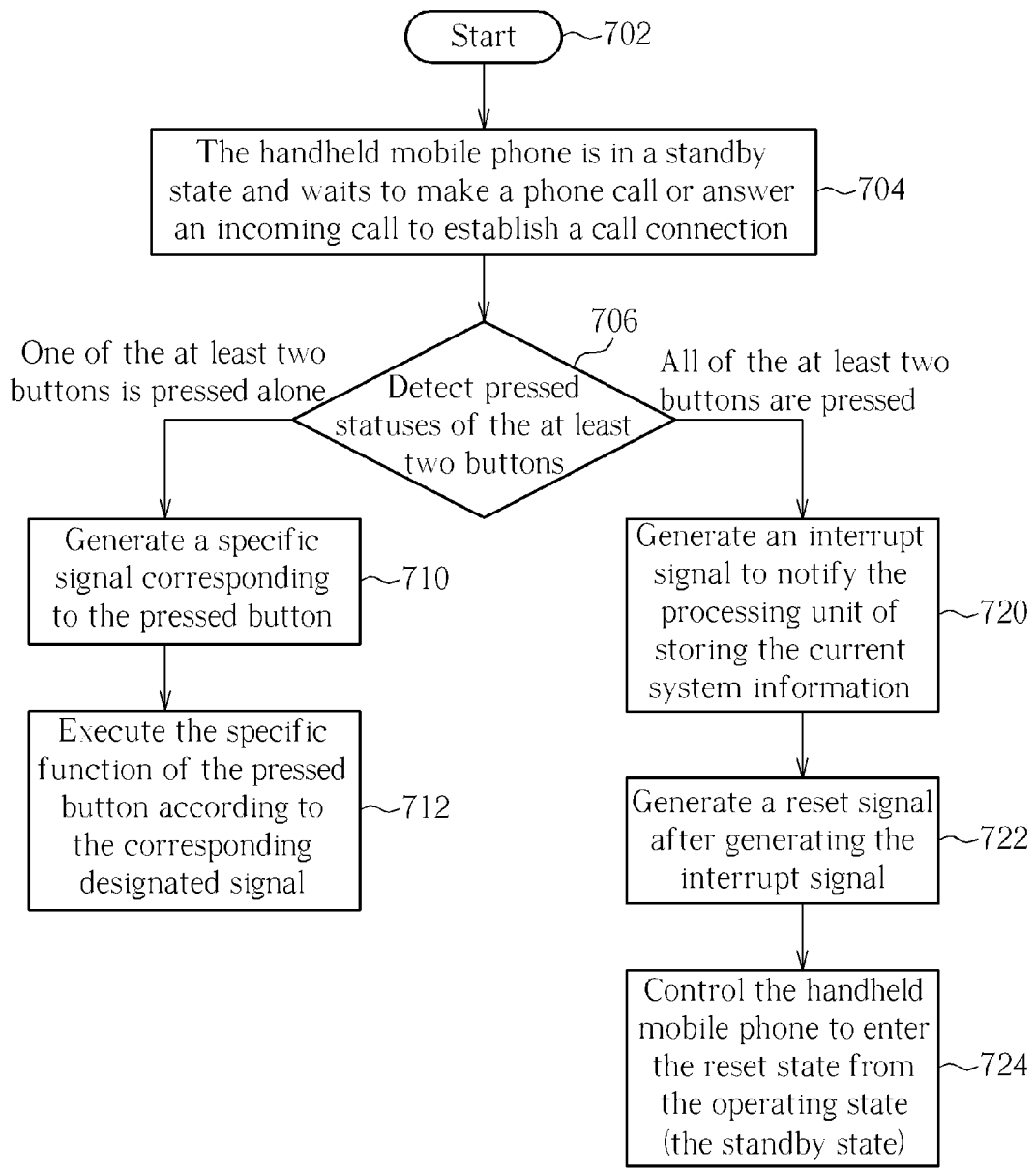
FIG. 7 is a flowchart illustrating a method for resetting a handheld mobile phone according to an exemplary embodiment of the present disclosure.

Please refer to FIG. 7. FIG. 7 is a flowchart illustrating a method for resetting a handheld mobile phone according to an exemplary embodiment of the present disclosure. Please note that the following steps are not limited to be performed according to the exact sequence shown in FIG. 7 if a roughly identical result can be obtained. The method includes, but is not limited to, the following steps:

Step 702: Start.

Step 704: The handheld mobile phone is in a standby state and waits to make a phone call or answer an incoming call to establish a call connection.

Step 706: Detect pressed statuses of the at least two buttons. When one of the at least two buttons is pressed alone, go to Step 710; when all of the at least two buttons are pressed, go to Step 720.

Step 710: Generate a specific signal corresponding to the pressed button. After that, go to Step 712.

Step 712: Execute the specific function of the pressed button according to the corresponding specific signal.

Step 720: Generate an interrupt signal to notify the processing unit of storing the current system information. After that, go to Step 722.

Step 722: Generate a reset signal after generating the interrupt signal. After that, go to Step 724.

Step 724: Control the handheld mobile phone to enter the reset state from the operating state (the standby state).

How each element operates can be known by collocating the steps shown in FIG. 7 and the elements shown in FIG. 1 and FIG. 2, and further description is omitted here for brevity. Be noted that a condition that one of the at least two buttons is pressed alone is represented by the steps 710~712, while another condition that all of the at least two buttons are pressed is represented by the steps 720~724.

Figure 8:
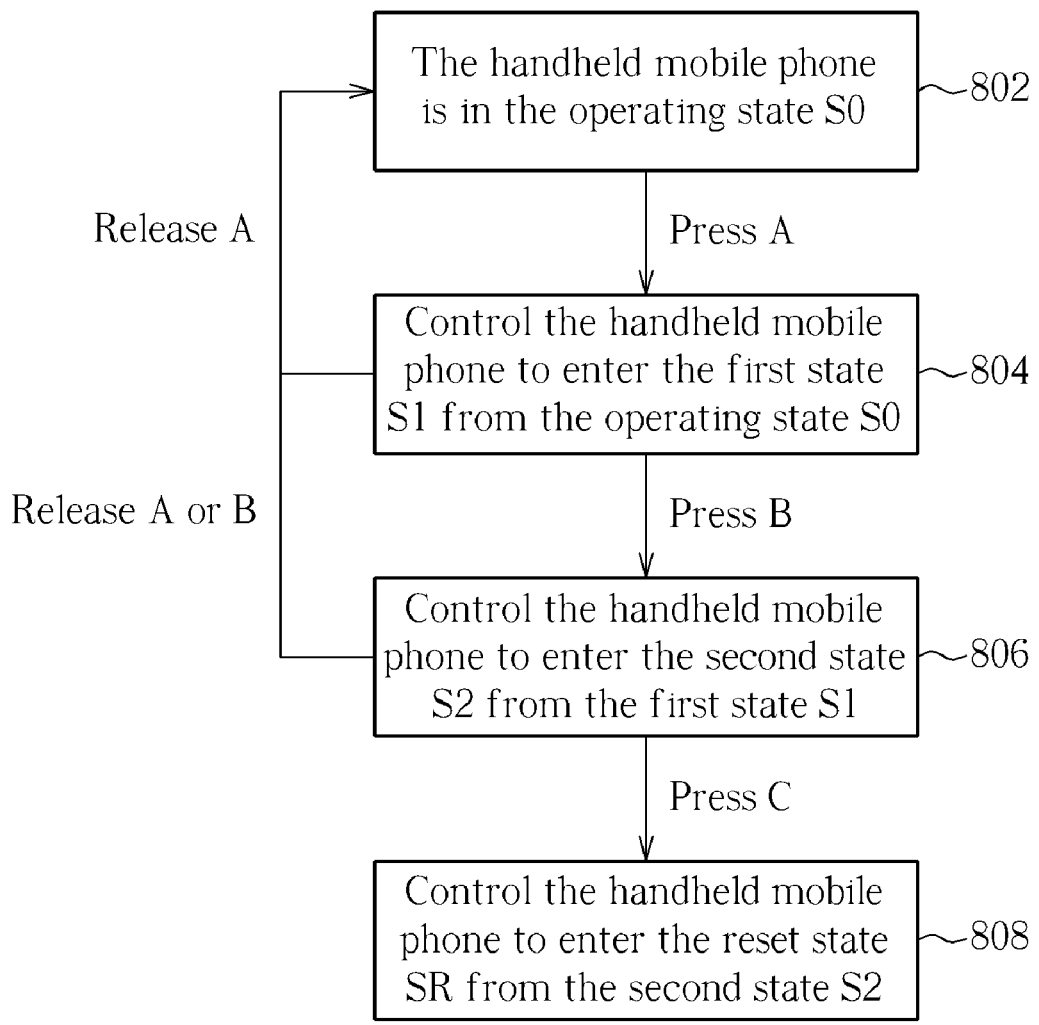
FIG. 8 is a simplified flowchart illustrating a method for resetting a handheld mobile phone according to another exemplary embodiment of the present disclosure.

FIG. 8 is a simplified flowchart illustrating a method for resetting a handheld mobile phone according to another exemplary embodiment of the present disclosure. The method includes, but is not limited to, the following steps:

Step 802: The handheld mobile phone is in the operating state S0. When the button A is pressed and the buttons B and C are not pressed, go to Step 804.

Step 804: Control the handheld mobile phone to enter the first state S1 from the operating state S0. When the button B is subsequently pressed (that is, both of the buttons A and B have been pressed) and the button C is not pressed, go to Step 806; or when the button A is released, go back to Step 802.

Step 806: Control the handheld mobile phone to enter the second state S2 from the first state S1. When the button C is subsequently pressed (that is, all of the buttons A, B, and C have been pressed), go to Step 808; or when the button A or the button B is released, go back to Step 802.

Step 808: Control the handheld mobile phone to enter the reset state SR from the second state S2.

As detailed operations of the steps shown in FIG. 8 are already described in FIG. 6 above, further description is omitted here for brevity. Be noted that the steps shown in FIG. 8 are directed to the condition that all of the three buttons are pressed with considerations of the pressed sequence of the pressed buttons (i.e. A→B→C), while the condition that one of the three buttons is pressed alone is omitted.

Please note that, the steps of the abovementioned flowcharts are merely practicable embodiments of the present disclosure, and in no way should be considered to be limitations of the scope of the present disclosure. The method can include other intermediate steps or several steps can be merged into a single step without departing from the spirit of the present disclosure.

The abovementioned embodiments are presented merely for describing the present disclosure, and in no way should be considered to be limitations of the scope of the present disclosure. In summary, the present disclosure provides a handheld mobile phone and a related method for resetting the handheld mobile phone. The conventional reset button can be replaced by making use of pressing two (or more) physical buttons of the handheld mobile phone together with a button flowchart so as to reset the handheld mobile phone. Therefore, not only can the cost and the space of a reset button be saved, but also can the problem that users cannot find a stylus or a tip-like object to sting the reset button in the prior art be solved, which can bring more convenience to the user. Furthermore, the button flowcharts disclosed in the present disclosure can be divided into a non-sequential flowchart and a sequential flowchart (with considerations of the pressed sequence of the pressed buttons) in order to avoid erroneous actions.

Those skilled in the art will readily observe that numerous modifications and alterations of the device and method may be made while retaining the teachings of the disclosure.

What is claimed is:

1. A handheld mobile phone, comprising:
   at least two buttons, each button used for performing at least one specific function;
   a logic circuit, coupled to the at least two buttons, for generating a corresponding specific signal when one of the at least two buttons is pressed alone, and for generating at least a control signal when all of the at least two buttons are pressed; and
   a processing unit, coupled to the logic circuit, for executing the specific function of the pressed button according to the corresponding specific signal, and for controlling the handheld mobile phone to enter a reset state from an operating state according to at least the control signal when all of the at least two buttons are pressed;
   wherein when a first button among the at least two buttons is pressed and a second button among the at least two buttons is not pressed, the processing unit controls the handheld mobile phone to enter a first state from the operating state; and when both of the first button and the second button are pressed, the processing unit controls the handheld mobile phone to enter the reset state from the first state.

2. The handheld mobile phone of claim 1, wherein the operating state is a standby state, used for waiting to make a phone call or answer an incoming call so as to establish a call connection.

3. The handheld mobile phone of claim 2, wherein the at least two buttons comprises a send button, and the processing unit makes the phone call or answers the incoming call to establish the call connection according to the specific signal corresponding to the send button when the handheld mobile phone is in the standby state.

4. The handheld mobile phone of claim 3, wherein the at least two buttons comprises an end button, and the processing unit interrupts the call connection according to the specific signal corresponding to the end button.

5. The handheld mobile phone of claim 1, further comprising:
   a speaker; and
   the at least two buttons comprises a volume button;
   wherein the processing unit adjusts a volume of the speaker according to the specific signal corresponding to the volume button.

6. The handheld mobile phone of claim 1, wherein the at least two buttons comprises a power button, and the processing unit powers off the handheld mobile phone according to the specific signal corresponding to the power button.

7. The handheld mobile phone of claim 1, wherein the at least two buttons comprise three buttons; when the first button among the three buttons is pressed and the second button and a third button among the three buttons are not pressed, the processing unit controls the handheld mobile phone to enter the first state from the operating state; when both of the first button and the second button are pressed and the third button is not pressed, the processing unit controls the handheld mobile phone to enter a second state from the first state; and when all of the first button, the second button, and the third button are pressed, the processing unit controls the handheld mobile phone to enter the reset state from the second state.

8. The handheld mobile phone of claim 1, wherein:
   the control signal is a reset signal;
   when all of the at least two buttons are pressed, the logic circuit generates an interrupt signal to notify the processing unit of storing current system information, and generates the reset signal after generating the interrupt signal; and
   the processing unit controls the handheld mobile phone to enter the reset state from the operating state according to the reset signal and the interrupt signal.

9. The handheld mobile phone of claim 1, wherein the control signal is a reset signal; and when the handheld mobile phone enters the reset state from the operating state, the processing unit resets the handheld mobile phone.

10. The handheld mobile phone of claim 9, further comprising:
    a random access memory (RAM); and
    a read-only memory (ROM), for storing an embedded operating system;
    wherein when the processing unit resets the handheld mobile phone, the processing unit clears the RAM and then loads the embedded operating system into the RAM.

11. The handheld mobile phone of claim 1, wherein the at least two buttons are selected from a group consisting of a send button, an end button, a home button, a volume up button, a volume down button, a power button, and an OK button.

12. The handheld mobile phone of claim 1, wherein the handheld mobile phone is a personal digital assistant phone (PDA phone).

13. A method for resetting a handheld mobile phone, the handheld mobile phone comprising at least two buttons, and each button used for performing at least one specific function, the method comprising:
    detecting pressed statuses of the at least two buttons;
    when one of the at least two buttons is pressed alone, generating a corresponding specific signal;
    executing the specific function of the pressed button according to the corresponding specific signal;
    when all of the at least two buttons are pressed, generating at least a control signal; and
    controlling the handheld mobile phone to enter a reset state from an operating state according to at least the control signal;
    wherein the step of controlling the handheld mobile phone to enter the reset state from the operating state according to at least the control signal comprises:

when a first button among the at least two buttons is pressed and a second button among the at least two buttons is not pressed, controlling the handheld mobile phone to enter a first state from the operating state; and when both of the first button and the second button are pressed, controlling the handheld mobile phone to enter the reset state from the first state.

14. The method of claim 13, wherein the operating state is a standby state, and the method further comprises:

waiting to make a phone call or answer an incoming call so as to establish a call connection.

15. The method of claim 13, wherein the at least two buttons comprises three buttons, and the step of controlling the handheld mobile phone to enter the reset state from the operating state according to at least the control signal comprises:

when the first button among the three buttons is pressed and the second button and a third button among the three buttons are not pressed, controlling the handheld mobile phone to enter the first state from the operating state;

when both of the first button and the second button are pressed and the third button is not pressed, controlling the handheld mobile phone to enter a second state from the first state; and when all of the first button, the second button, and the third button are pressed, controlling the handheld mobile phone to enter the reset state from the second state.

16. The method of claim 13, wherein the control signal is a reset signal, and the step of controlling the handheld mobile phone to enter the reset state from the operating state according to at least the control signal comprises:

resetting the handheld mobile phone by making use of the reset signal.

17. The method of claim 16, wherein when all of the at least two buttons are pressed, the step of generating at least the control signal further comprises:

when all of the at least two buttons are pressed, generating an interrupt signal to notify a processing unit of storing current system information, and generating the reset signal after generating the interrupt signal.

18. The method of claim 17, wherein the step of controlling the handheld mobile phone to enter the reset state from the operating state according to at least the control signal comprises:

controlling the handheld mobile phone to enter the reset state from the operating state according to the reset signal and the interrupt signal.

19. The method of claim 16, wherein the handheld mobile phone further comprises a random access memory (RAM) and a read-only memory (ROM) used for storing an embedded operating system, and the step of resetting the handheld mobile phone by making use of the reset signal comprises:

clearing the RAM, and then loading the embedded operating system into the RAM.

* * * * *